United States Patent
Yang (10) Patent No.: US 7,623,492 B2
(45) Date of Patent: Nov. 24, 2009

(54) METHOD, APPARATUS AND COMPUTER PROGRAM PRODUCT PROVIDING PACKET FILTER SYNCHRONIZATION

(75) Inventor: Jianhao Michael Yang, San Diego, CA (US)

(73) Assignee: Nokia Corporation, Espoo (FI)

( * ) Notice: Subject to any disclaimer, the term of this patent is extended or adjusted under 35 U.S.C. 154(b) by 740 days.

(21) Appl. No.: 11/282,999

(22) Filed: Nov. 18, 2005

(65) Prior Publication Data

US 2007/0115932 A1 May 24, 2007

(51) Int. Cl.
*H04W 4/00* (2009.01)
(52) U.S. Cl. ...................... 370/331; 370/401
(58) Field of Classification Search .............. 370/331, 370/401
See application file for complete search history.

(56) References Cited

U.S. PATENT DOCUMENTS

| 2004/0109459 A1* | 6/2004 | Madour et al. .............. 370/401 |
| 2005/0243870 A1 | 11/2005 | Balogh et al. |
| 2006/0256752 A1* | 11/2006 | Svensson et al. ............ 370/331 |
| 2006/0268781 A1* | 11/2006 | Svensson et al. ............ 370/331 |

OTHER PUBLICATIONS

3rd Generation Partnership Project 2, X32-200500926-xxx HRPD to 1x Handoff [MOT].doc; "Architecture for Handoff of IMS/HRPD VoIP Call to 1x Circuit Voice Call"; p. 10-12; Sep. 2005.

* cited by examiner

*Primary Examiner*—Albert T Chou
(74) *Attorney, Agent, or Firm*—Harrington & Smith, PC (57) ABSTRACT

A method including establishing a first packet flow over a network between a first mobile device and a second mobile device said first mobile device coupled to a node having a first packet filter including an identifier and specifying a second mobile device as a first end point, interposing a remote data connection end point between said first and second mobile device, adding a second packet filter at said node including said identifier and specifying said remote data connection end point as a second end point, establishing a second packet flow between said first and second mobile devices via said remote data connection end point, and removing said first packet filter.

43 Claims, 5 Drawing Sheets

METHOD, APPARATUS AND COMPUTER PROGRAM PRODUCT PROVIDING PACKET FILTER SYNCHRONIZATION

TECHNICAL FIELD

This invention relates generally to a method, apparatus, and a computer program product for synchronizing packet filters in wireless communications.

BACKGROUND

The following definitions are herewith defined:
3GPP—Third Generation Partnership Project
HAT—Hybrid Access Terminal for CDMA1x and EV-DO
VoIP—Voice over Internet Protocol
CS—Circuit Switched
IMS—Integrated Multimedia Service
SIP—Session Initiation Protocol
S-CSCF—Serving Call Signalling Control Function
MGCF—Media Gateway Control function
MGW—Media Gateway
RTP Real-time Transport Protocol
HOF—Handoff Function/SIP Proxy
PDSN—Packet Data Support Node
GGSN—Gateway GPRS Support Node With the advance of broadband wireless communication technologies, more and more broadband wireless access networks are emerging. CDMA1x EV-DO, IEEE 802.11 based WLAN, and IEEE 802.16 based WiMAX, are just a few examples of recent technology advancements. The use of Voice over Internet Protocol (VoIP) over these broadband wireless access networks is considered cost efficient and enables rich call services. However, conventional circuit switched voice networks, such as CDMA1x or GSM, are likely to serve as the primary voice services in the near future. As a result, hybrid solutions that are capable of leveraging emerging broadband wireless access technologies and which are also backward compatible with the more conventional circuit switched networks are desirable.

At present, CDMA-1x EV-DO (hereinafter "EV-DO") has gained industry support. Typically, EV-DO is deployed as an overlay network with a CDMA-1x network, thus providing an overlaid coverage area. One reason for the overlay deployment of EV-DO is to provide a mechanism for offloading traffic from the CDMA-1x networks, especially data services related traffic. In order to enable network access in an overlaid coverage area, the use of hybrid access terminals (HATs) that are capable of both EV-DO and CDMA-1x network access is preferred. EV-DO Rev. A enhances the quality of service (QoS) support, particularly for VoIP. As a result, VoIP over EV-DO (VoIP/EV-DO) Rev. A is being considered as a desirable feature for service providers or network operators.

When two HATs, for example HAT-A and HAT-B, are engaging in IMS calls, the media path is peer-to-peer. In other words, the real-time transport protocol (RTP) end points are at HAT-A and HAT-B. To enforce QoS treatment for the forward direction media traffic, HATs send packet filters to the corresponding PDSNs. The packet filter typically comprises a RTP source IP address and a port number. When an RTP packet from HAT-B reaches the PDSN-A for HAT-A, the packet filter is used to match the RTP packet to the ongoing packet flow between HAT-B and HAT-A and header compression is applied. The compressed RTP packet is then sent to a flow exhibiting an acceptable delay sensitive QoS for receipt by HAT-A.

There exist several models for adoption into the 3GPP and 3GPP2 standards to deal with handover from a VOIP call to a switched circuit voice call. According to the dynamic anchoring model, in order to prepare one of the HATs, for example HAT-B, to hand down to a circuit switched voice call, a media gateway (MGW) is put in the middle of the RTP path as the anchor point. From the perspective of HAT-A, this means that the RTP end point is changed during the call, giving rise to the following issues.

First, it can be noted that the original packet filter in PDSN-A is no longer valid because the RTP packets arriving at HAT-A are now coming from the media gateway. As a result, there is a need to update the packet filter on PDSN-A. Secondly, there is an interval between the moment when the MGW is interposed into the RTP path and the time when the media gateway starts to send RTP packet to HAT-A. During this interval, the original packet filter in the PDSN-A is still valid but needs to be updated to reflect the existence of the MGW. During this interval, it is probable that one or more packets will be misdirected resulting in an unacceptable loss of data.

Such a problem is not unique to communications wherein a MGW is interposed between two HATs. The same problem exists in other situations, such as when the remote data end point is changed during a data connection session. For example, a SIP user agent may change devices during an IMS session, such as in the instance of a call transfer. In order to provide seamless service continuity in such events, the packet filter in the PDSN (3GPP2) or GGSN(3GPP) should be updated.

SUMMARY OF THE PREFERRED EMBODIMENTS

In accordance with an exemplary embodiment of the invention a method includes establishing a first packet flow over a network between a first mobile device and a second mobile device, said first mobile device coupled to a node having a first packet filter including an identifier and specifying a second mobile device as a first end point, interposing a remote data connection end point between said first and second mobile device, adding a second packet filter at said node including said identifier and specifying said remote data connection end point as a second end point, establishing a second packet flow between said first and second mobile devices via said remote data connection end point, and removing said first packet filter.

In another exemplary embodiment of the invention, a wireless network includes a means for establishing a first packet flow over a network between a first mobile device and a second mobile device said first mobile device coupled to a node having a first packet filter including an identifier and specifying a second mobile device as a first end point, a means for interposing a remote data connection end point between said first and second mobile device, a means for adding a second packet filter at said first node including said identifier and specifying said remote data connection end point as a second end point, a means for establishing a second packet flow between said first and second mobile devices via said remote data connection end point, and a means for removing said first packet filter.

In another exemplary embodiment of the invention, a computer program product is embodied in a computer readable medium the execution of which by a data processor of a first mobile device includes the operations of receiving and sending a first packet flow over a network between said first mobile device and a second mobile device said first mobile device coupled to a first node having a first packet filter including an identifier and specifying said second mobile device as a first end point, receiving a notification from a remote data connection end point interposed between said first and second mobile device, instructing said node to add a second packet filter at said first node including said identifier and specifying said remote data connection end point as a second end point, receiving and sending a second packet flow between said first and second mobile devices via said remote data connection end point, and instructing said node to remove said first packet filter.

In a further exemplary embodiment of the invention, a computer program product is embodied in a computer readable medium the execution of which by a data processor of a node coupled to a first mobile device includes the operations of receiving and sending a first packet flow over a network between said first mobile device and a second mobile device said node coupled to said first mobile device and having a first packet filter including an identifier and specifying a second mobile device as a first end point, adding a second packet filter at said node including said identifier and specifying a remote data connection end point as a second end point, receiving and sending a second packet flow between said first and second mobile devices via said remote data connection end point, and removing said first packet filter.

In another exemplary embodiment of the invention, a system includes a first mobile device sending and receiving a first packet flow having an identifier over a network with a second mobile device, a remote data connection end point interposed between said first and second mobile devices through which flows a second packet flow having said identifier, an HOF for informing said first mobile device of a presence of said remote data connection end point, and a node coupled to said first mobile device for storing a first packet filter including said identifier and specifying said second mobile device as a first end point and a second packet filter including said identifier and specifying said remote data connection end point as a second end point wherein said node, at a direction of said first mobile device, removes said second packet filter.

In another exemplary embodiment of the invention, a method for performing handover from a first network to a second network includes establishing a first packet flow over a first network between a first mobile device and a second device, interposing a remote data connection end point to form a second packet flow over a second network between said first and second mobile devices, maintaining at a node coupled to said first mobile device and through which flows said first and second packet flows a first packet filter associated with said first packet flow and a second packet filter associated with said second packet flow wherein said first and second packet filters have an identifier, and removing said first packet filter in response to a receipt by said first mobile device of said second packet flow.

BRIEF DESCRIPTION OF THE DRAWINGS

The foregoing and other aspects of these teachings are made more evident in the following Detailed Description, when read in conjunction with the attached Drawing Figures, wherein.

DETAILED DESCRIPTION

A technique is needed for resolving the various issues discussed above in order to support seamless change of data connection end points. More specifically, a technique is needed to synchronize the packet filters for HATs in the event of a hand down so as to ensure that the QoS in the forward direction transmissions is enforced as before the hand down.

In an exemplary embodiment of the invention, a method is provided for facilitating seamless handover from VoIP over EV-DO networks to circuit switched voice networks, such as CDMA-1x, through the synchronization of packet filters. While illustrated with reference to communication between two hybrid access terminals, the invention is not so limited. Rather the invention is drawn broadly to encompass any and all communication between entities via a wireless access network wherein the remote data end points of one or both entities is changed during a data connection session. Seamless handover is enabled by the synchronization of packet filters following a change in a data connection end point.

As will be described more fully below, when a mobile device, such as a HAT, receives an indication from the access network indicating a change of the remote data connection end point, a new RSVP message is sent to the packet data serving node (PDSN) associated with the HAT. The RSVP message is formatted to request the PDSN to add a new packet filter for the remote data connection end point using the same service instance as the original packet filter. Specifically, the new packet filter contains filter criteria such as the new data connection end point IP address and port number. Thus, while data packets from the new data connection end point are to be considered part of a separate packet flow, they will be mapped to the same service instance that carries the original packet flow.

As a result, for a period of time, the PDSN maintains more than one packet filter for the service instance that carries the packet flows. Both packet filters specify the same treatment for packets addressed to the HAT associated with a given PDSN. As a result, data packets which are received from a HAT or from the MGW 15 and that match a packet filter resident on one or the other, will be sent to the same service instance. Then, when a HAT receives a data packet from the new connection end point, it sends another RSVP message to its associated PDSN instructing the PDSN to delete the original filter. At this point, the remote connection end point switching has successfully occurred.

Figures 1, 1B:
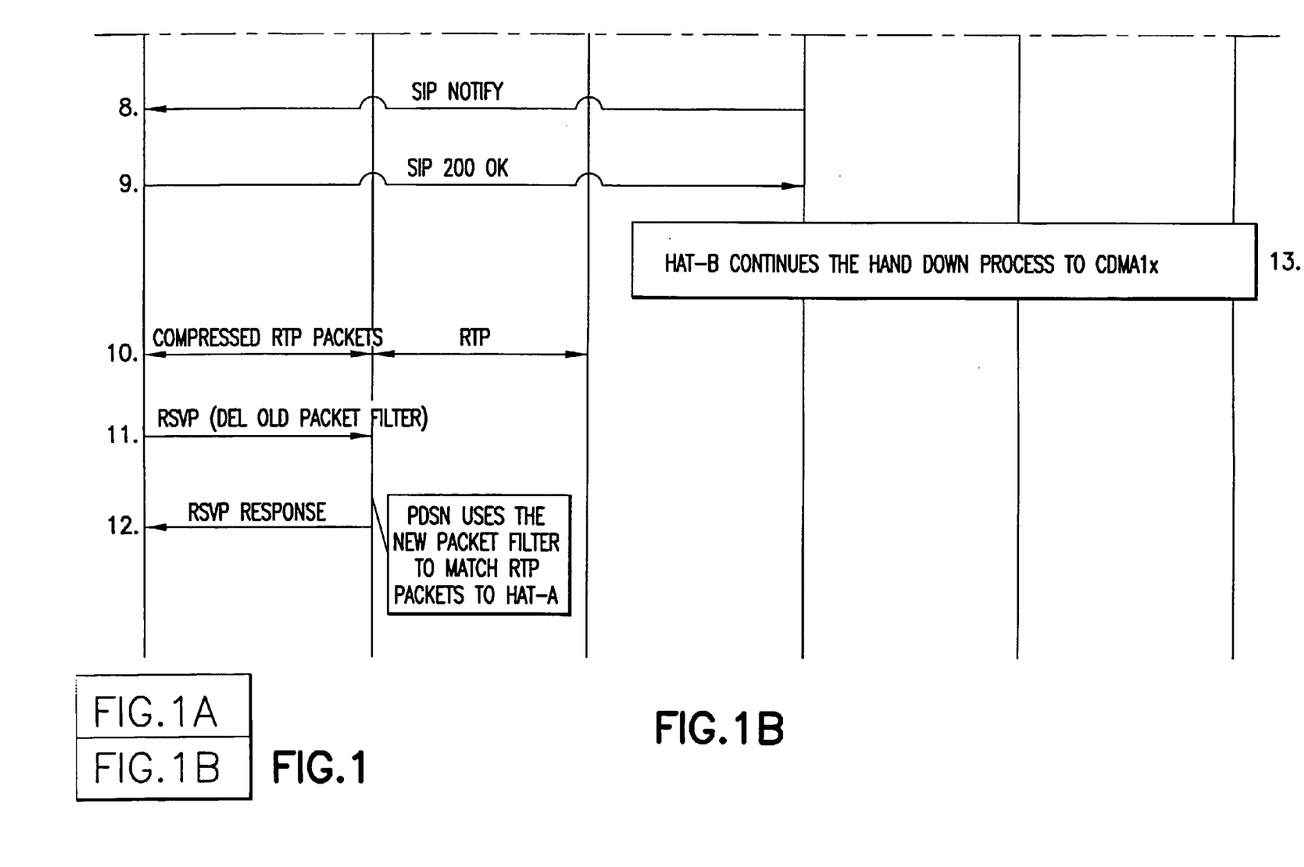
FIG. 1 is a signaling diagram of an exemplary embodiment of the method of the invention.
Figure 1A:
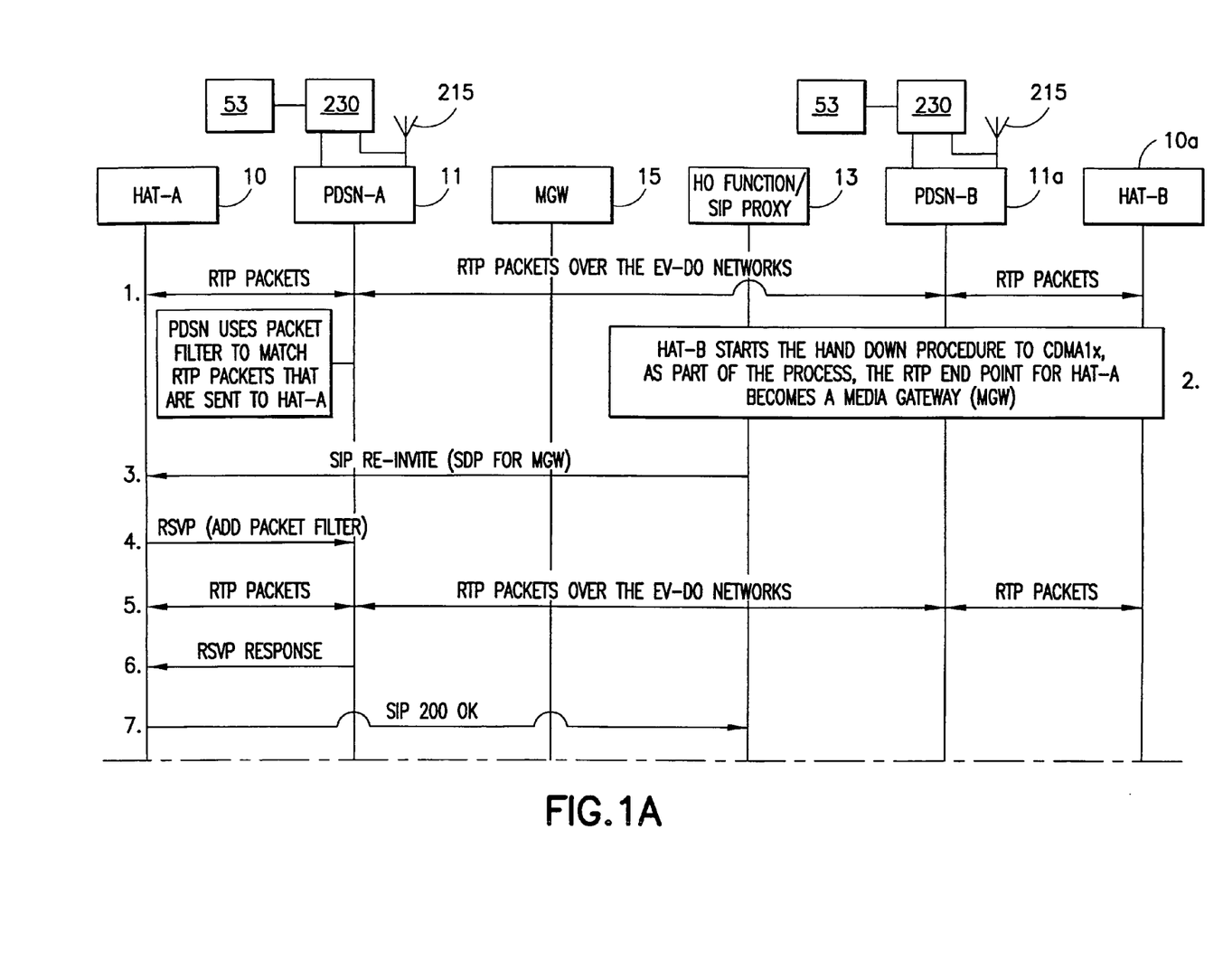

With reference to FIG. 1, there is illustrated a non-limiting, exemplary embodiment of an implementation of the methodology of the invention. As illustrated, two HATs, HAT-A 10 and HAT-B 10*a*, are in initial communication with each other over a wireless access network, such as a VoIP/EV-DO network, prior to a hand down to a CDMA-1x access network. Associated with HAT-A 10 is PDSN-A 11, and, conversely, PDSN-B 11*a* is associated with HAT-B 10*a*. The Media Gateway (MGW), as described more fully below, is inserted between the two HATs.

The following is a step by step description of the exemplary illustrated methodology. At step 1, HAT-A 10 and HAT-B 10*a* are initially engaged in communication utilizing a VoIP/EV-DO protocol. RTP packets are sent directly from peer-to-peer, or, more precisely, between HAT-A 10 and HAT-B 10*a*. The packet filter for the RTP flow (hereinafter, the "original filter") in the PDSN-A 11, for example, contains the IP address and port number of HAT-B 10*a*. PDSN-A 11 utilizes the packet filter to match incoming RTP packets from HAT-B 10*a* to HAT-A 10. More specifically, using the packet filter, PDSN-A 11 compresses the packets originating from HAT-B 10*a*, and sends them to HAT-A 10 through a service instance that has the required delay sensitive QoS. The packets are eventually mapped into a delay sensitive resource location protocol (RLP) flow. For the purposes of illustration, the SR_ID for this service instance is SR_ID_1.

At step 2, HAT-B 10*a* starts the hand down process to the CDMA-1x network. As part of the process, the MGW 15 in the visiting network for HAT-B 10*a* is interposed in the media path. As a result, the MGW 15 becomes the RTP end point for the HAT-A 10.

At step 3, a session initiation protocol (SIP) Re-Invite message is sent to HAT-A 10 from the Handoff function/SIP proxy associated with the MGW 15. The Re-Invite message contains the session description protocol (SDP) description for the media gateway, including the IP address and a unique port number of the MGW 15.

At step 4, when HAT-A 10 receives the Re-Invite message of step 3, HAT-A 10 sends a RSVP message to the PDSN-A 11 informing the PDSN-A 11 to add a packet filter. The RSVP message contains a 3GPP2_Object such as one defined in IS-835 D. One example of such an object is a traffic flow template (TFT) and is illustrated in Table 1 as follows:

TABLE 1

| 1 | | | | | | |
|---|---|---|---|---|---|---|
| 0 1 2 3 4 5 6 7 8 9 0 1 2 3 4 5 6 7 8 9 0 1 2 3 4 5 6 7 8 9 0 1 | | | | | | |
| MSIPv4 address | | | | | | |
| Reserved | N S | SR_ID = SD_ID_1 | Reserved | P | TFT Operation Code = 011 (add new filter) | Number of Packet filters = 1 |
| Packet filter list | | | | | | |

The TFT is a 32 bit, or four byte, data structure that includes an operation code, a number of packet filters field, and an SR_ID designation field. In the example, a TFT operation code of "011" specifies that a new filter is to be added while the number of packets field indicates that a single packet is to be added. Note that the SR_ID value (SD_ID_1) is the same as the original packet filter for the on-going RTP flow as noted with reference to step 1. The TFT further specifies the IP address and port number of the MGW 15.

Note that during the RSVP and SIP messaging (steps 3 and 4), the original peer-to-peer RTP flow is ongoing as shown at step 5. To facilitate such ongoing RTP flow, PDSN-A 11 utilizes the original packet filter to match forward direction RTP packets from HAT-B 10*a* to HAT-A 10. In order to obtain a seamless hand down, the original packet filter is not yet deleted.

At step 6, PDSN-A 11 responds to HAT-A 10 with a RSVP Response message. The RSVP response message serves to notify the HAT-A 10 that the packet filter indicated in the RSVP message of step 4 was received and added.

After the success of the RSVP messaging (steps 4 and 6), HAT-A 10 sends a SIP 200 OK message to the SIP Handoff Function (HOF) at step 7 to notify the HOF 13 that the PDSN-A 11 has a packet filter resident for accepting packets from HAT-B 10*a* via the MGW 15. When the HOF 13 determines that the media stream to HAT-A 10 from HAT-B 10*a* is flowing via the media gateway, the HOF 13 sends a SIP NOTIFY message to HAT-A 10 at step 8, and HAT-A 10 responds, at step 9, with an SIP 200 OK message acknowledging receipt of the SIP NOTIFY message.

At step 10, HAT-A 10 proceeds to send RTP packets to the media gateway via PDSN-A 11. Likewise, the MGW 15 sends RTP packets to HAT-A 10 via PDSN-A 11. When such packets arrive at PDSN-A 11, the new packet filter is applied. The RTP packets are compressed or subjected to other packet treatments as desired and sent to the same EV-DO service instance or link flow as was performed prior to the interposing of the MGW 15 between HAT-A 10 and HAT-B 10*a*.

Upon receipt by HAT-A 10 of RTP packets from the media gateway, the original packet filter is rendered obsolete. In response to this fact, at step 11, HAT-A 10 sends another RSVP message to PDSN-A 11 instructing PDSN-A 11 to delete the original packet filter. In the RSVP message, the TFT operation code is set to be "101". This TFT operation code instructs PDSN-A 11 to delete packet filters from the existing TFT.

At step 12, the PDSN-A 11 responds to HAT-A 10 with a RSVP response message acknowledging receipt of the previous RSVP message.

At step 13, HAT-B 10*a* continues the hand down procedure during the above described process.

Figures 2, 2A:
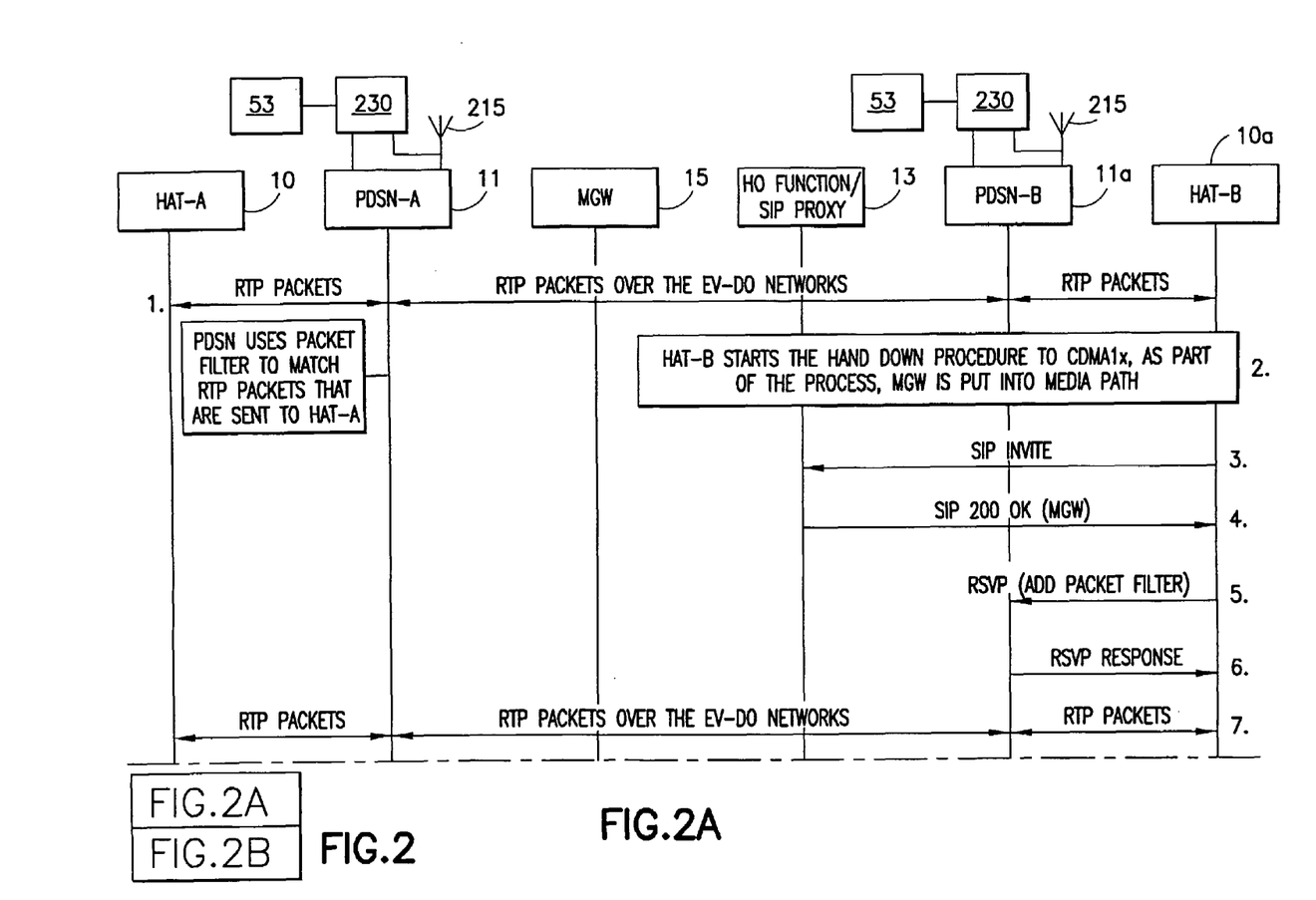
FIG. 2 is a signaling diagram of another exemplary embodiment of the method of the invention.
Figure 2B:
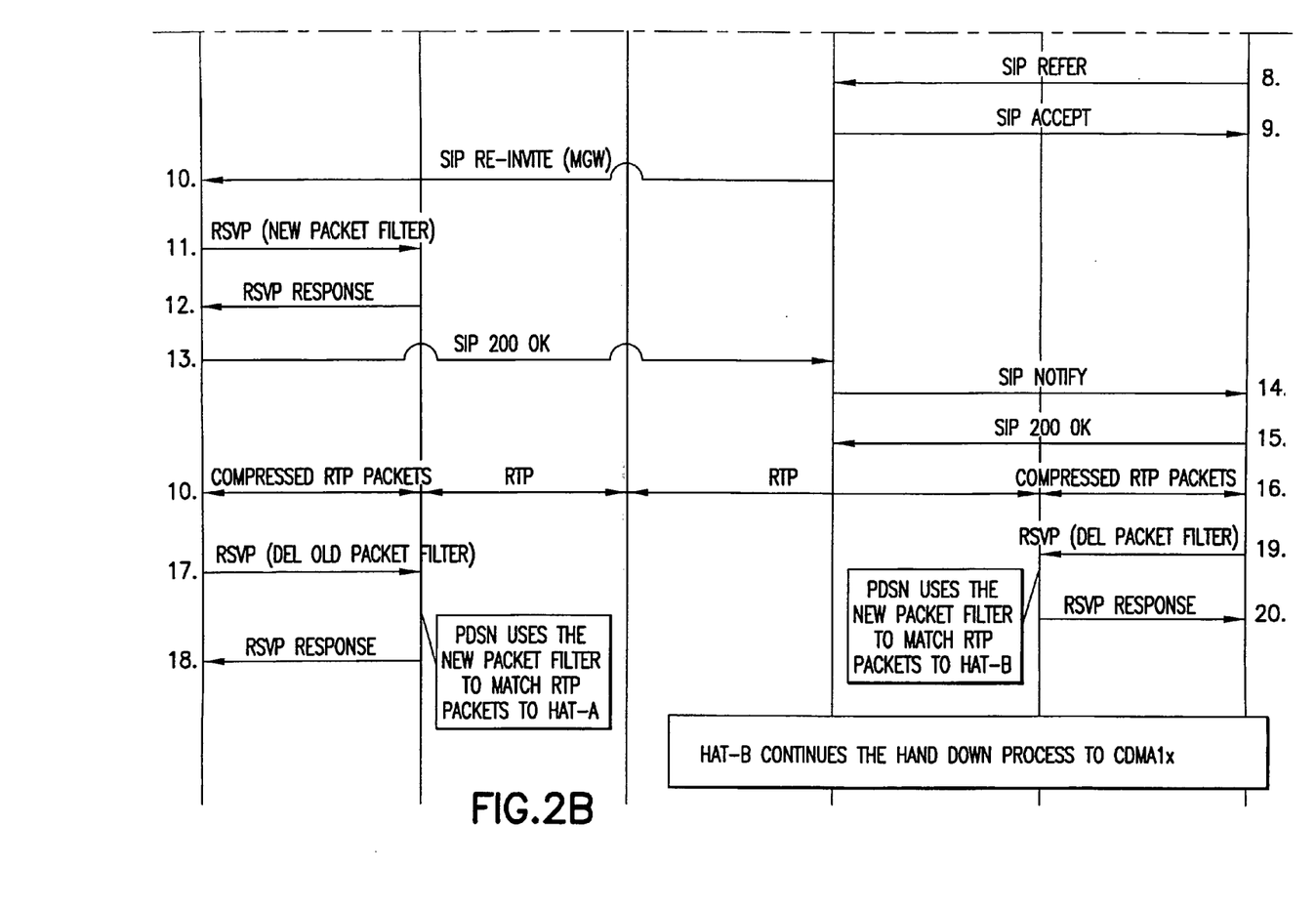

With reference to FIG. 2, there is illustrated an exemplary alternative embodiment of the invention wherein the SIP signalling sequence is altered. At step 1, HAT-A 10 and HAT-B 10*a* are initially engaged in communication utilizing a VoIP/EV-DO protocol. RTP packets are sent directly from peer-to-peer, or, more precisely, between HAT-A 10 and HAT-B 10*a*. The packet filter for the RTP flow (hereinafter, the "original filter") in the PDSN-A 11, for example, contains the IP address and port number of HAT-B 10*a*. PDSN-A 11 utilizes a packet filter to match incoming RTP packets from HAT-B 10*a* to HAT-A 10. More specifically, using the packet filter, PDSN-A 11 compresses the packets originating from HAT-B 10*a*, and sends them to HAT-A 10 through a service instance that has the required delay sensitive QoS. The packets are eventually mapped into a delay sensitive resource location protocol (RLP) flow. For the purposes of illustration, the SR_ID for this service instance is SR_ID_1.

At step 2, HAT-B 10*a* starts the hand down process to the CDMA-1x network. Unlike the method illustrated in FIG. 1, HAT-B 10*a* affirmatively invites the HOF 13 to interpose the MGW 15 between HAT-A 10 and HAT-B 10*a*. This is accomplished at step 3 where HAT-B 10*a* issues a SIP INVITE to the HOF 13.

In response to the SIP INVITE message, the HOF 13, at step 4, responds to HAT-B 10*a* with a SIP 200 OK message which includes the IP address and a unique port number of the media gateway.

As in the previous exemplary embodiment, at steps 5 and 6 a RSVP message is sent from HAT-B 10*a* to PDSN-B 11*a* informing PDSN-B 11*a* to add a packet filter for the MGW 15. PDSN-B 11*a* then proceeds to acknowledge receipt of the RSVP message via an RSVP Response message.

Note that during the RSVP and SIP messaging (steps 3-6), the original peer-to-peer RTP flow is ongoing as shown at step 7. To facilitate such ongoing RTP flow, PDSN-A 11 utilizes the original packet filter to match forward direction RTP packets from HAT-B 10*a* to HAT-A 10. Likewise, PDSN-B 11*a* utilizes its original packet filter to match forward direction RTP packets from HAT-A 10 to HAT-B 10*a*. In order to obtain a seamless hand down, the original packet filter is not yet deleted.

Having successfully added the packet filter to the PDSN-B 11*a* at steps 5 and 6, HAT-B 10*a* sends a SIP REFER message to the HOF 13 triggering the HOF 13 to send an SIP Re-Invite message to HAT-A 10 at step 10. The SIP Re-Invite message includes address information for the newly interposed MGW 15. In addition, in response to the SIP Refer message of step 8, the HOF 13 sends an acknowledgement to HAT-B 10*a* via an SIP ACCEPT message at step 9.

At steps 11 and 12, similar to the operation of HAT-B 10*a* at steps 5 and 6, a RSVP message is sent from HAT-A 10 to PDSN-A 11 informing PDSN-A 11 to add a packet filter for the MGW 15. PDSN-A 11 then proceeds to acknowledge receipt of the RSVP message via an RSVP Response message. At this point, as a new packet filter was added to PDSN-B 11a at step 5, data packets sent to HAT-B 10a from HAT-A 10 via the MGW 15 will be treated appropriately by PDSN-B 11a and sent on to HAT-B 10a.

At step 13, HAT-A 10 acknowledges receipt of the SIP Re-Invite message by sending a SIP 200 OK message to the HOF 13. Upon receipt of the SIP 200 OK message, at step 14, the HOF 13 sends an SIP NOTIFY message to HAT-B 10a informing HAT-B 10a that the SIP REFER message of step 8 has resulted in the successful addition of a new packet filter to PDSN-A 11. HAT-B 10a acknowledges the receipt of the SIP NOTIFY message by sending a SIP 200 OK message to the HOF 13 at step 15.

At this point, both HAT_A and HAT_B are clear to send RTP packets to one another via the MGW 15 as the packet filters in each PDSN have been updated to properly route data packets originating at an opposing HAT through the MGW 15 as illustrated at step 16.

Lastly, at steps 17-20, both HAT-A 10 and HAT-B 10a send RSVP messages to their respective PDSNs to delete the original packet filters. The respective PDSNs then acknowledge the instruction for deletion via respective RSVP Response messages. Subsequently, HAT-B 10a continues the hand down process to a CDMA-1x network.

Figure 3:
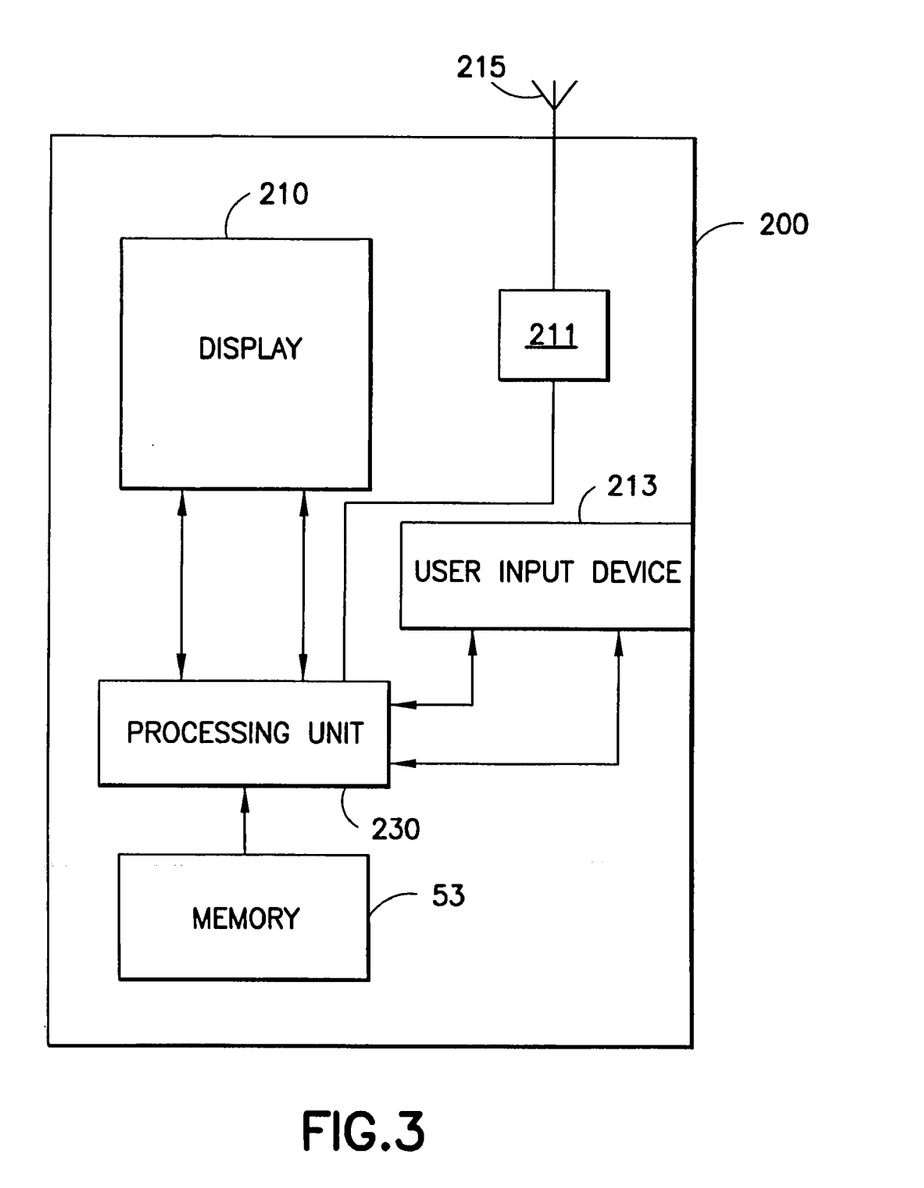
FIG. 3 is a signaling diagram of an exemplary embodiment of a mobile device for practicing the invention.

With reference to FIG. 3, there is illustrated a diagram of an exemplary embodiment of an implementation of the invention in a mobile device or station 200. In a preferred embodiment, mobile station 200 is a portable telephone, such as a HAT. Mobile device 200 is formed of a user input device 213 coupled to the processor 230. Processor 230 is coupled to a panel 210, and a memory 53 upon which is stored data required by the processor 230. Processor 230 is further coupled to a transceiver 211 which is in turn coupled to an antenna 215. Additional network elements, such as PDSNs and MGWs are likewise formed of a processor 230 coupled to a means for sending and receiving data 215, and a memory 53.

In general, the various embodiments of the mobile device 200 can include, but are not limited to, cellular telephones, HATs, portable electronic devices, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention involving the receipt, formatting, and sending of messages by the mobile device 200 may be implemented by computer software executable by a data processor of the mobile device 200, such as the processor 230, or by hardware, or by a combination of software and hardware.

The memory 53 may be of any type suitable to the local technical environment and may be implemented using any suitable data storage technology, such as semiconductor-based memory devices, magnetic memory devices and systems, optical memory devices and systems, fixed memory and removable memory. The data processor 230 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments, such as sending, formatting, and receiving data packets and messages, may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Certain embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

What is claimed is:

1. A method comprising:
    establishing, at a node located between a first apparatus and a second apparatus, a first packet flow over a network between said first apparatus and said second apparatus, wherein said node has a first packet filter comprising an identifier and specifying said second apparatus as a first end point;
    interposing a remote data connection end point between said node and said second apparatus, wherein said remote data connection end point comprises a media gateway;
    sending a session initiation protocol (SIP) Re-Invite message from a Handoff Function/SIP Proxy associated with said media gateway to said first apparatus via said node;
    in response to receiving a first message from said first apparatus, adding a second packet filter at said node comprising said identifier and specifying said remote data connection end point as a second end point;
    establishing a second packet flow between said first apparatus and said second apparatus via said node and via said remote data connection end point; and
    in response to receiving a second message from said first apparatus, removing said first packet filter, wherein said second message is sent in response to said first apparatus receiving a communication via said second packet flow.

2. The method of claim 1 wherein said node comprises a packet data serving node or a gateway GPRS support node.

3. The method of claim 1 wherein said network comprises a packet switched network.

4. The method of claim 1 wherein said identifier comprises a service instance or a service identifier.

5. The method of claim 1 wherein said first message comprises an RSVP message comprising said second packet filter.

6. The method of claim 5 further comprising sending a RSVP Response message to said first apparatus from said node in response to a receipt of said RSVP message.

7. The method of claim 1 wherein said second packet flow is established in response to said node receiving a notification from said Handoff Function/SIP Proxy.

8. The method of claim 7 wherein said notification comprises a SIP Notify message.

9. The method of claim 1 wherein said second packet flow flows over an additional network different from said network.

10. The method of claim 9 wherein said additional network comprises a cellular circuit switched network or a CDMA-1x network.

11. The method of claim 1 wherein each of said first apparatus and said second apparatus comprises a hybrid access terminal (HAT) or a portable telephone.

12. An apparatus comprising:
  means for establishing, at a node located between a first apparatus and a second apparatus, a first packet flow over a network between said first apparatus and said second apparatus, wherein said node has a first packet filter comprising an identifier and specifying said second apparatus as a first end point;
  means for interposing a remote data connection end point between said node and said second apparatus, wherein said remote data connection end point comprises a media gateway;
  means for sending a session initiation protocol (SIP) Re-Invite message from a Handoff Function/SIP Proxy associated with said media gateway to said first apparatus via said node;
  means for adding, in response to receiving a first message from said first apparatus, a second packet filter at said first node comprising said identifier and specifying said remote data connection end point as a second end point;
  means for establishing a second packet flow between said first apparatus and said second apparatus via said node and said remote data connection end point; and
  means for removing, in response to receiving a second message from said first apparatus, said first packet filter, wherein said second message is sent in response to said first apparatus receiving a communication via said second packet flow.

13. A computer readable medium storing a computer program, the execution of which by a data processor of a first apparatus comprises the operations of:
  sending a first packet filter from said first apparatus to a node, wherein said first packet filter is for use at least with a first packet flow, wherein said first packet filter comprises an identifier and specifies a second apparatus as a first end point;
  establishing said first packet flow over a network between said first apparatus and said second apparatus via said node;
  interposing a remote data connection end point between said node and said second apparatus, wherein said remote data connection end point comprises a media gateway;
  receiving, via said node, a session initiation protocol (SIP) Re-Invite message from a Handoff Function/SIP Proxy associated with said media gateway;
  sending a first message from said first apparatus to said node, wherein said first message instructs said node to add a second packet filter at said node comprising said identifier and specifying said remote data connection end point as a second end point;
  establishing, by said first apparatus, a second packet flow between said first apparatus and said second apparatus via said node and said remote data connection end point; and
  sending, in response to said first apparatus receiving a communication via said second packet flow, a second message from said first apparatus to said node, wherein said second message instructs said node to remove said first packet filter.

14. The computer readable medium of claim 13 wherein said node comprises a packet data serving node or a gateway GPRS support node.

15. The computer readable medium of claim 13 wherein said identifier comprises a service instance or a service identifier.

16. The computer readable medium of claim 13 wherein said first message comprises an RSVP message.

17. The computer readable medium of claim 13 wherein said second message comprises an RSVP message.

18. The computer readable medium of claim 13 wherein each of said first apparatus and said second apparatus comprises a hybrid access terminal (HAT) or a portable telephone.

19. The computer readable medium of claim 13 wherein said network comprises a packet switched network.

20. A computer readable medium storing a computer program, the execution of which by a data processor of a node comprises the operations of:
  establishing, at said node, a first packet flow over a network between a first apparatus and a second apparatus, wherein said node is located between said first apparatus and said second apparatus and has a first packet filter comprising an identifier and specifying said second apparatus as a first end point;
  interposing a remote data connection end point between said node and said second apparatus, wherein said remote data connection end point comprises a media gateway;
  sending a session initiation protocol (SIP) Re-Invite message from a Handoff Function/SIP Proxy associated with said media gateway to said first apparatus via said node;
  in response to receiving a first message from said first apparatus, adding a second packet filter at said node comprising said identifier and specifying said remote data connection end point as a second end point;
  establishing a second packet flow between said first apparatus and said second apparatus via said node and said remote data connection end point; and
  in response to receiving a second message from said first apparatus, removing said first packet filter, wherein said second message is sent in response to said first apparatus receiving a communication via said second packet flow.

21. The computer readable medium of claim 20 wherein said node comprises a packet data serving node or a gateway GPRS support node.

22. The computer readable medium of claim 20 wherein said remote data connection end point comprises a media gateway.

23. The computer readable medium of claim 20 wherein each of said first apparatus and said second apparatus comprises a hybrid access terminal or a portable telephone.

24. A method comprising:
  sending a first packet filter from a first apparatus to a node, wherein said first packet filter is for use at least with a first packet flow, wherein said first packet filter comprises an identifier and specifies a second apparatus as a first end point;
  establishing, by said first apparatus, said first packet flow over a network between said first apparatus and said second apparatus via said node;

interposing a remote data connection end point between said node and said second apparatus, wherein said remote data connection end point comprises a media gateway;

receiving, via said node, a session initiation protocol (SIP) Re-Invite message from a Handoff Function/SIP Proxy associated with said media gateway;

sending a first message from said first apparatus to said node, wherein said first message instructs said node to add a second packet filter at said node comprising said identifier and specifying said remote data connection end point as a second end point;

establishing, by said first apparatus, a second packet flow between said first apparatus and said second apparatus via said node and said remote data connection end point; and sending, in response to said first apparatus receiving a communication via said second packet flow, a second message from said first apparatus to said node, wherein said second message instructs said node to remove said first packet filter.

25. The method of claim 24 wherein said identifier comprises a service instance or a service identifier.

26. The method of claim 24 wherein said network comprises a EV-DO network or a packet switched network.

27. The method of claim 24 wherein said network comprises a first network and wherein said second packet flow is sent over a second network comprising a cellular circuit switched network or a CDMA-1x network.

28. An apparatus comprising:
a memory configured to store a first packet filter comprising an identifier and specifying a second apparatus as a first end point;
a transceiver configured to send the first packet filter to a node, wherein said first packet filter is for use at least with a first packet flow; and
a data processor configured to establish said first packet flow over a network between said apparatus and another apparatus via said node,
wherein a remote data connection end point is interposed between said node and said other apparatus, wherein said remote data connection end point comprises a media gateway,
wherein said transceiver is further configured to receive, via said node, a session initiation protocol (SIP) Re-Invite message from a Handoff Function/SIP Proxy associated with said media gateway,
wherein said transceiver is further configured to send a first message to said node, wherein said first message instructs said node to add a second packet filter at said node comprising said identifier and specifying said remote data connection end point as a second end point,
wherein said data processor is further configured to establish a second packet flow between said apparatus and said other apparatus via said node and said remote data connection end point,
wherein said transceiver is further configured to send, in response to said apparatus receiving a communication via said second packet flow, a second message to said node, wherein said second message instructs said node to remove said first packet filter.

29. The apparatus of claim 28 wherein said node comprises a packet data serving node or a gateway GPRS support node.

30. The apparatus of claim 28 wherein said network comprises a packet switched network.

31. The apparatus of claim 28 wherein said identifier comprises a service instance or a service identifier.

32. The apparatus of claim 28 wherein said first message comprises an RSVP message comprising said second packet filter.

33. The apparatus of claim 32 wherein said transceiver is further configured to receive a RSVP Response message from said node in response to a receipt of said RSVP message.

34. The apparatus of claim 28 wherein said second packet flow flows over an additional network different from said network and wherein said additional network comprises a cellular circuit switched network or a CDMA-1x network.

35. The apparatus of claim 28 wherein said apparatus comprises a hybrid access terminal (HAT) or a portable telephone.

36. A node comprising:
a memory configured to store a first packet filter, wherein said node is located between a first apparatus and a second apparatus, wherein said first packet filter comprises an identifier and specifies the second apparatus as a first end point; and
a processor coupled to the memory and configured to establish a first packet flow over a network between said first apparatus and said second apparatus,
wherein a remote data connection end point is interposed between said node and said second apparatus, wherein said remote data connection end point comprises a media gateway,
wherein a session initiation protocol (SIP) Re-Invite message is sent from a Handoff Function/SIP Proxy associated with said media gateway to said first apparatus via said node,
wherein the processor is further configured to add, in response to the node receiving a first message from the first apparatus, a second packet filter to the memory, said second packet filter comprising said identifier and specifying said remote data connection end point as a second end point,
wherein the processor is further configured to establish a second packet flow between said first apparatus and said second apparatus via said node and via said remote data connection end point,
wherein the processor is further configured, in response the node to receiving a second message from the first apparatus, to remove said first packet filter, wherein said second message is sent in response to the first apparatus receiving a communication via said second packet flow.

37. The node of claim 36 wherein said node comprises a packet data serving node or a gateway GPRS support node.

38. The node of claim 36 wherein said network comprises a packet switched network.

39. The node of claim 36 wherein said identifier comprises a service instance or a service identifier.

40. The node of claim 36 wherein said first message comprises an RSVP message comprising said second packet filter.

41. The node of claim 36 wherein said node is configured to send a RSVP Response message to said first apparatus in response to a receipt of said RSVP message.

42. The node of claim 36 wherein said second packet flow flows over an additional network different from said network and wherein said additional network comprises a cellular circuit switched network or a CDMA-1x network.

43. The node of claim 36 wherein each of said first apparatus and said second apparatus comprises a hybrid access terminal (HAT) or a portable telephone.

* * * * *